US009266177B2

(12) United States Patent
Smith et al.

(10) Patent No.: US 9,266,177 B2
(45) Date of Patent: *Feb. 23, 2016

(54) FLANGE BOLT CUTTER

(71) Applicant: Francis Torq/Lite, Inc., Luling, LA (US)

(72) Inventors: James Dodd Smith, Ventress, LA (US); Michael T. Ramsey, Luling, LA (US)

(73) Assignee: TORQ/LITE, LLC, Luling, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/475,028

(22) Filed: Sep. 2, 2014

(65) Prior Publication Data

US 2015/0047489 A1 Feb. 19, 2015

Related U.S. Application Data

(63) Continuation of application No. 13/555,416, filed on Jul. 23, 2012, now Pat. No. 8,820,205.

(60) Provisional application No. 61/592,669, filed on Jan. 31, 2012.

(51) Int. Cl.
*B23D 45/04* (2006.01)
*B23D 45/00* (2006.01)

(52) U.S. Cl.
CPC ............ *B23D 45/042* (2013.01); *B23D 45/003* (2013.01); *B23D 45/006* (2013.01); *Y10T 83/68* (2015.04); *Y10T 83/7755* (2015.04); *Y10T 83/8749* (2015.04)

(58) Field of Classification Search
CPC .. B23D 45/042; B23D 45/003; B23D 45/006; Y10T 83/68; Y10T 83/7755; Y10T 83/8749
USPC ........... 83/564, 745, 743, 483, 491, 315, 574; 30/101; 29/239
See application file for complete search history.

(56) References Cited

U.S. PATENT DOCUMENTS

| | | | | |
|---|---|---|---|---|
| 3,461,540 A * | 8/1969 | Nelson et al. | ................. | 228/102 |
| 3,704,516 A * | 12/1972 | Ono | ................................. | 30/96 |
| 3,857,425 A * | 12/1974 | Wiklund | ...................... | 144/34.1 |
| 3,866,496 A * | 2/1975 | Payne et al. | ................... | 83/471.3 |
| 3,997,957 A * | 12/1976 | Tone et al. | ...................... | 29/239 |
| 4,341,406 A * | 7/1982 | Abbes et al. | ................... | 285/408 |
| 4,610,064 A * | 9/1986 | Verstraeten | ..................... | 29/239 |
| 4,689,883 A * | 9/1987 | Dent | ............................... | 30/94 |
| 4,939,964 A * | 7/1990 | Ricci | ............................... | 82/113 |
| 5,081,768 A * | 1/1992 | Brennan et al. | ................ | 30/101 |
| 5,129,136 A * | 7/1992 | Richardson | ................. | 29/426.5 |
| 8,667,693 B2 * | 3/2014 | Ellis et al. | .......................... | 30/96 |
| 2005/0076508 A1* | 4/2005 | Green et al. | .................... | 30/101 |
| 2006/0032354 A1* | 2/2006 | Jaksha | ......................... | 83/467.1 |
| 2008/0010801 A1* | 1/2008 | Carson et al. | ................... | 29/282 |
| 2009/0205750 A1* | 8/2009 | Wright | .......................... | 144/4.1 |
| 2011/0113944 A1* | 5/2011 | Ellis et al. | ......................... | 83/745 |
| 2013/0330156 A1* | 12/2013 | Motz et al. | ..................... | 414/338 |

* cited by examiner

*Primary Examiner* — Sean Michalski
(74) *Attorney, Agent, or Firm* — Garvey, Smith, Nehrbass & North, LLC; Brett A. North

(57) ABSTRACT

A flange bolt cutter for separating two connected flanges. The flange bolt cutter contains a circular saw blade connected to an flange mount which can be vertically adjusted relative to the flange mount and/or includes two arms which can be pivotally adjusted relative to each other.

20 Claims, 17 Drawing Sheets

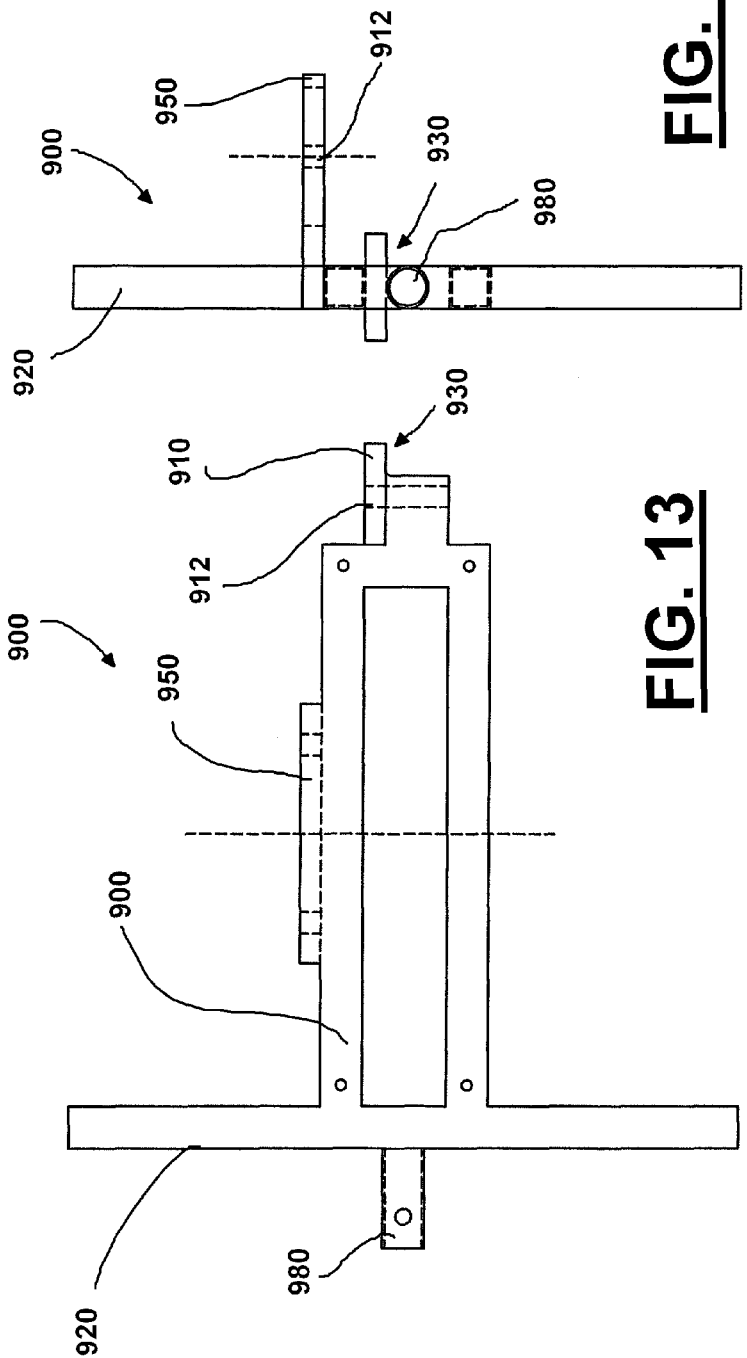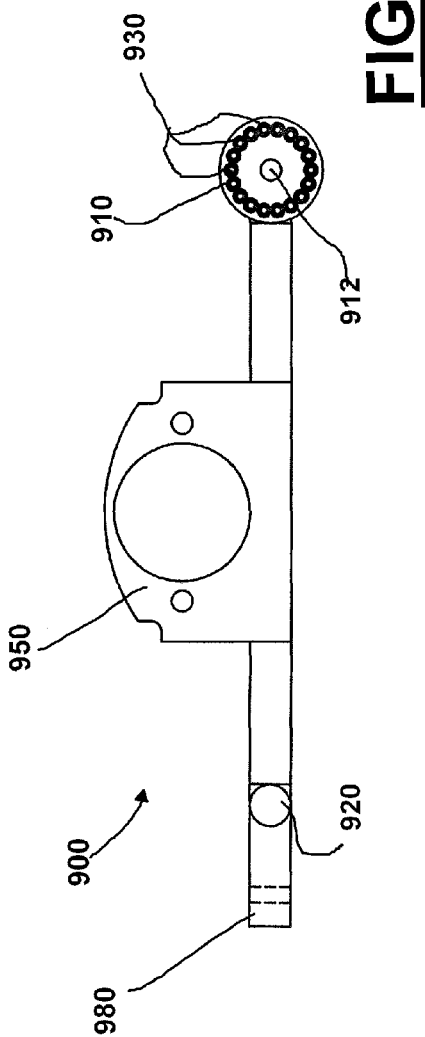

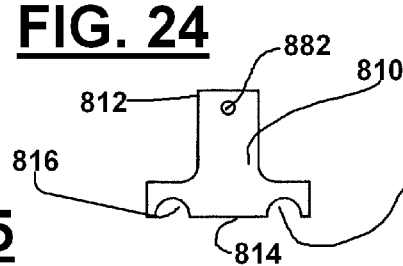
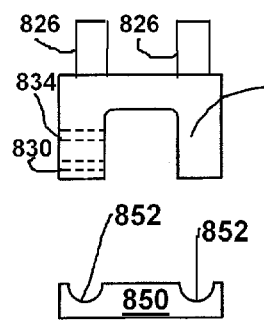
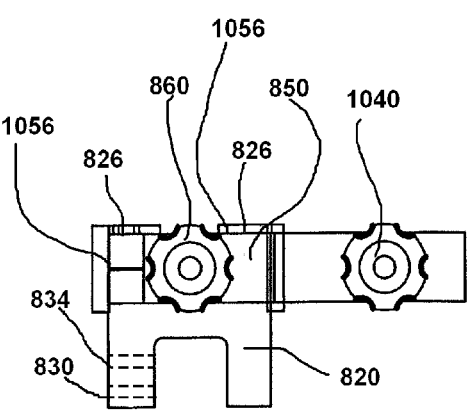
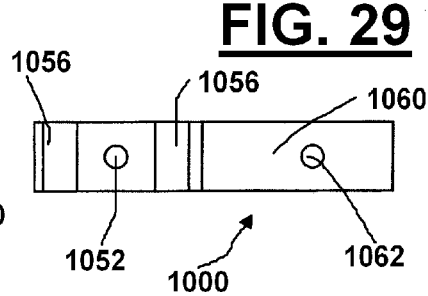
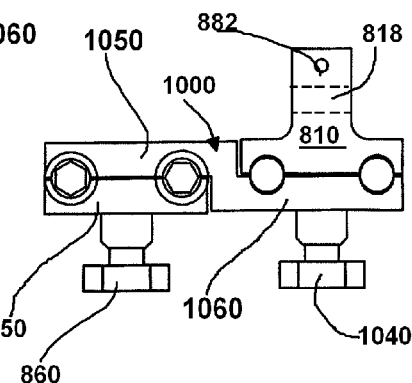
FIG. 24
FIG. 25
FIG. 26
FIG. 27
FIG. 28
FIG. 29
FIG. 30
FIG. 31

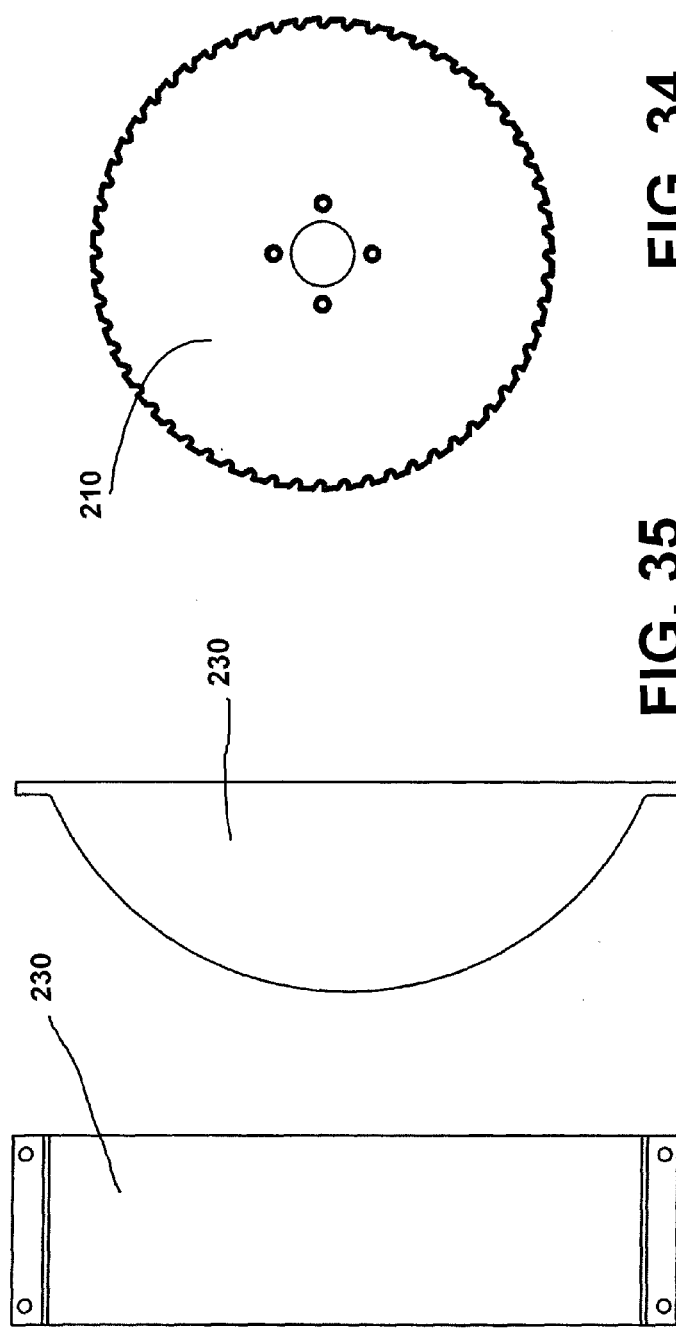
FIG. 34
FIG. 35
FIG. 36
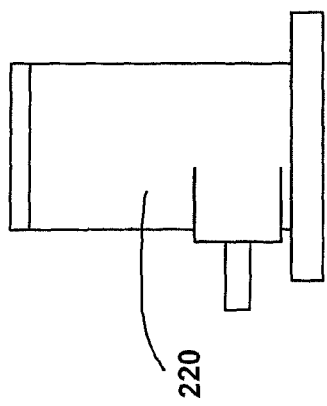
FIG. 32
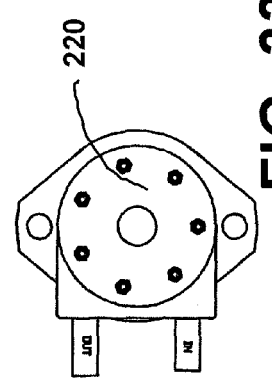
FIG. 33

FLANGE BOLT CUTTER

CROSS-REFERENCE TO RELATED APPLICATIONS

This is a continuation of U.S. patent application Ser. No. 13/555,416, filed Jul. 23, 2012 (issued as U.S. Pat. No. 8,820, 205 on Sep. 2, 2014), which is a non-provisional of U.S. Patent Application Ser. No. 61/592,669, filed Jan. 31, 2012, which application is incorporated herein by reference and to which priority is hereby claimed.

BACKGROUND

One embodiment relates generally to a method and apparatus for cutting bolts, and more particularly, for cutting a plurality of bolts in a flange connection.

Oil and natural gas platforms and installations have a limited life of operations. When oil runs out, the platforms and installations are decommissioned using a number of different alternatives. As examples, the platforms and installations may be (a) left completely or partially in the water (often called "reefing"); (b) removed and then reused in another location; or (c) hauled to shore for scrapping or recycling.

One of the problems encountered when attempting to separate flange connections during decommissioning is that the connections were exposed to marine elements for years tending to cause corrosion which resists methods of loosening the bolt and nut connections.

Some of the problems with cutters in the prior art is the inability of such devices to easily cut bolts for different size flanges or handle cutting of the bolts at different vertical heights of the bolts. Instead, such prior art cutters require specially sized attachment members for different sized flanges, and/or do not allow for the cutting of the bolts at either their tops or bottoms relative to a flange.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

SUMMARY

In one embodiment is provided a method and apparatus for reducing the costs of decommissioning abandoned oil and gas platforms by decreasing the time it takes to remove rusted nut/bolt connections in flange connections.

One embodiment provides a flange bolt cutter incorporating a circular saw assembly attached to first and second pivoting arms which themselves can be attached to the flange assembly via a flange mounting assembly.

In one embodiment the first and second arms are pivotally adjustable relative to each other which pivoting causes the cutting distance between the saw and the pivot point between the first arm and the saw blade.

The circular saw assembly may include a motor for rotatably driving the circular saw blade. The motor is a hydraulically operated motor.

BRIEF DESCRIPTION OF THE DRAWINGS

FIG. 13 is a side view of the second arm of the flange bolt cutter assembly of FIG. 1.

FIG. 14 is a rear view of the second arm of the flange bolt cutter assembly of FIG. 1.

FIG. 15 is a top view of the second arm of the flange bolt cutter assembly of FIG. 1.

FIG. 24 is a top view of the first section of the first arm.

FIG. 25 is a side view of the first section of the first arm.

FIG. 26 is a side view of the second section of the first arm.

FIG. 27 includes side and top views of the clamping member of the first section of the first arm.

FIG. 28 is a side view of the vertical extension member for the first arm.

FIG. 29 is a rear view of the vertical extension member for the first arm.

FIG. 30 is a rear view of the vertical extension member for the first arm vertically extending the first section of the first arm relative to the second section of the first arm.

FIG. 31 is a side view of FIG. 30.

FIGS. 32 and 33 are side and top views of the motor for the saw.

FIG. 34 is a top view of a saw blade.

FIGS. 35 and 36 are top and side views of the blade guard for the saw.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
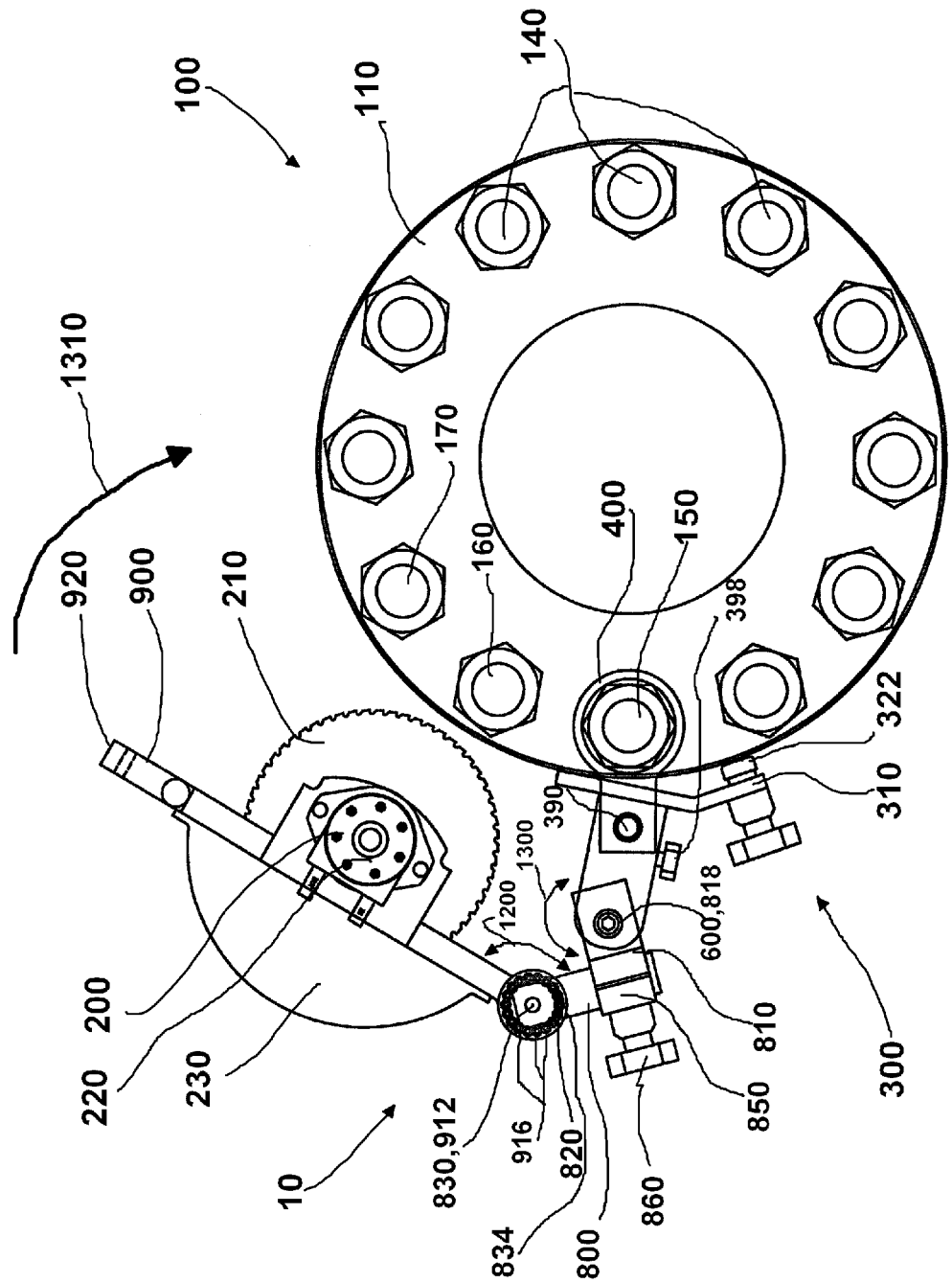
FIG. 1 is a top view of one embodiment of the flange bolt cutter assembly attached to a bolt on a flange.
Figure 2:
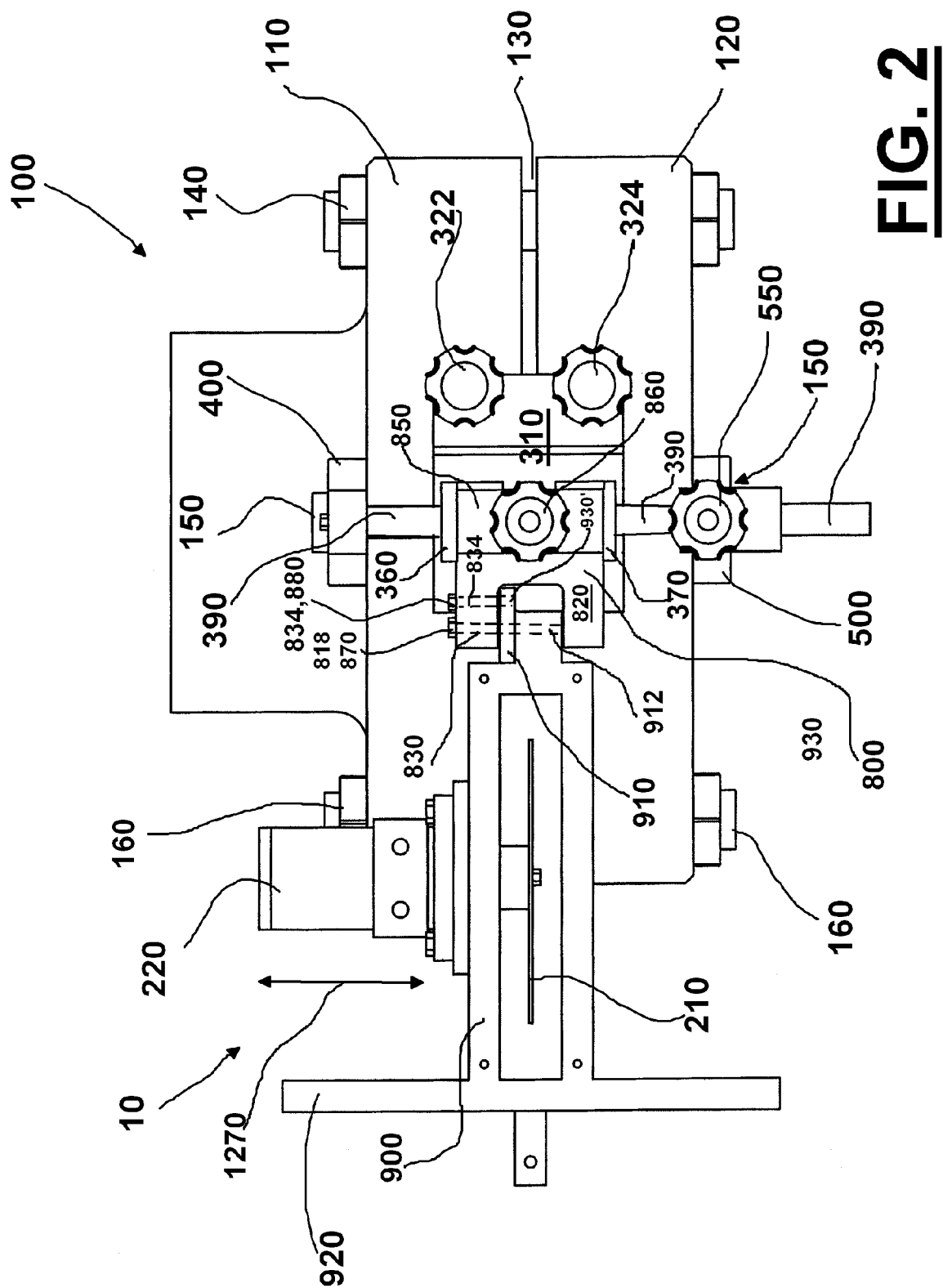
FIG. 2 is a side view of the flange bolt cutter assembly of FIG. 1.
Figure 3:
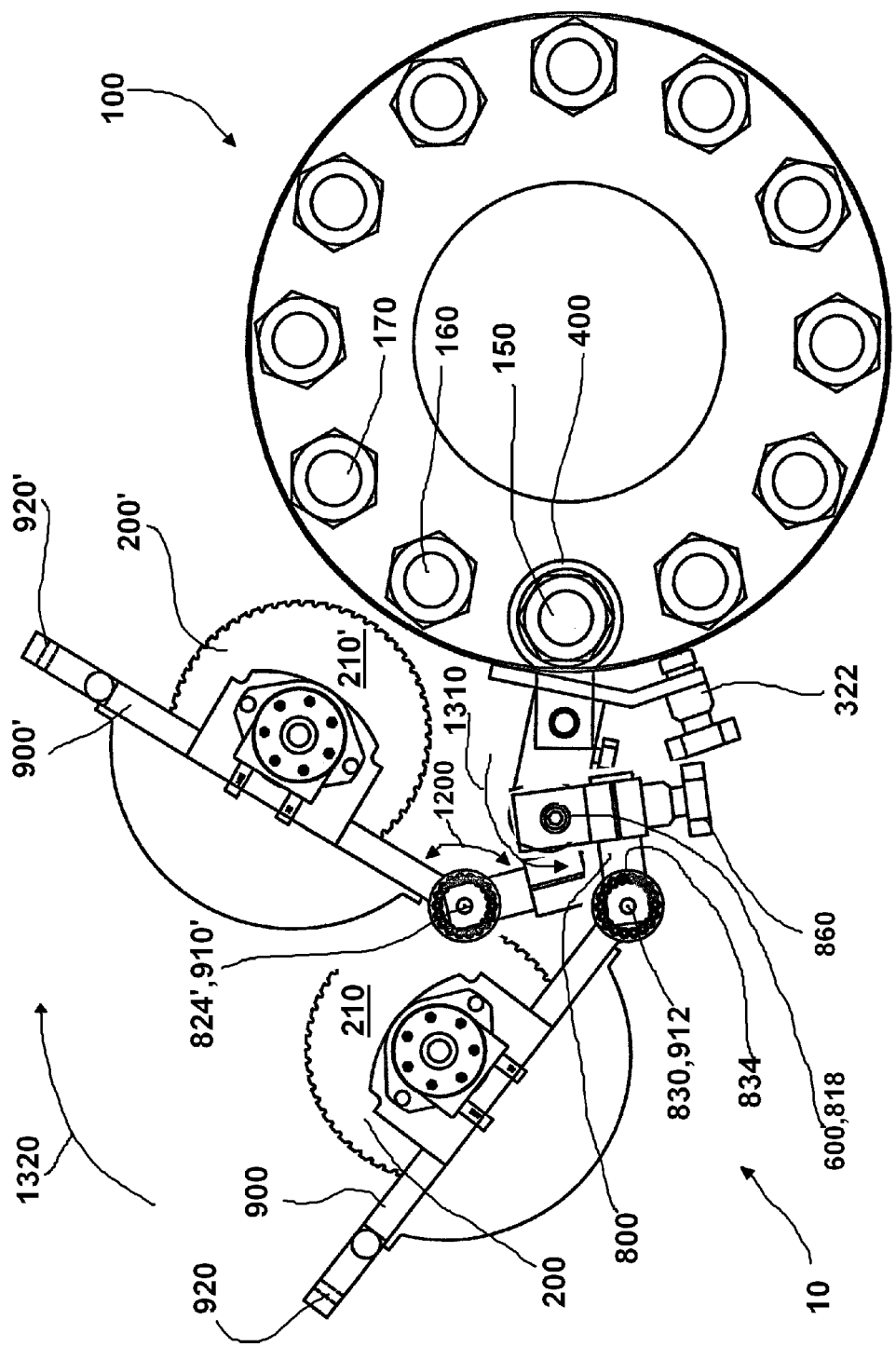
FIG. 3 is a top view of the flange bolt cutter assembly of FIG. 1, illustrating two different positions pivoting positions of the first arm relative to the flange.
Figure 4:
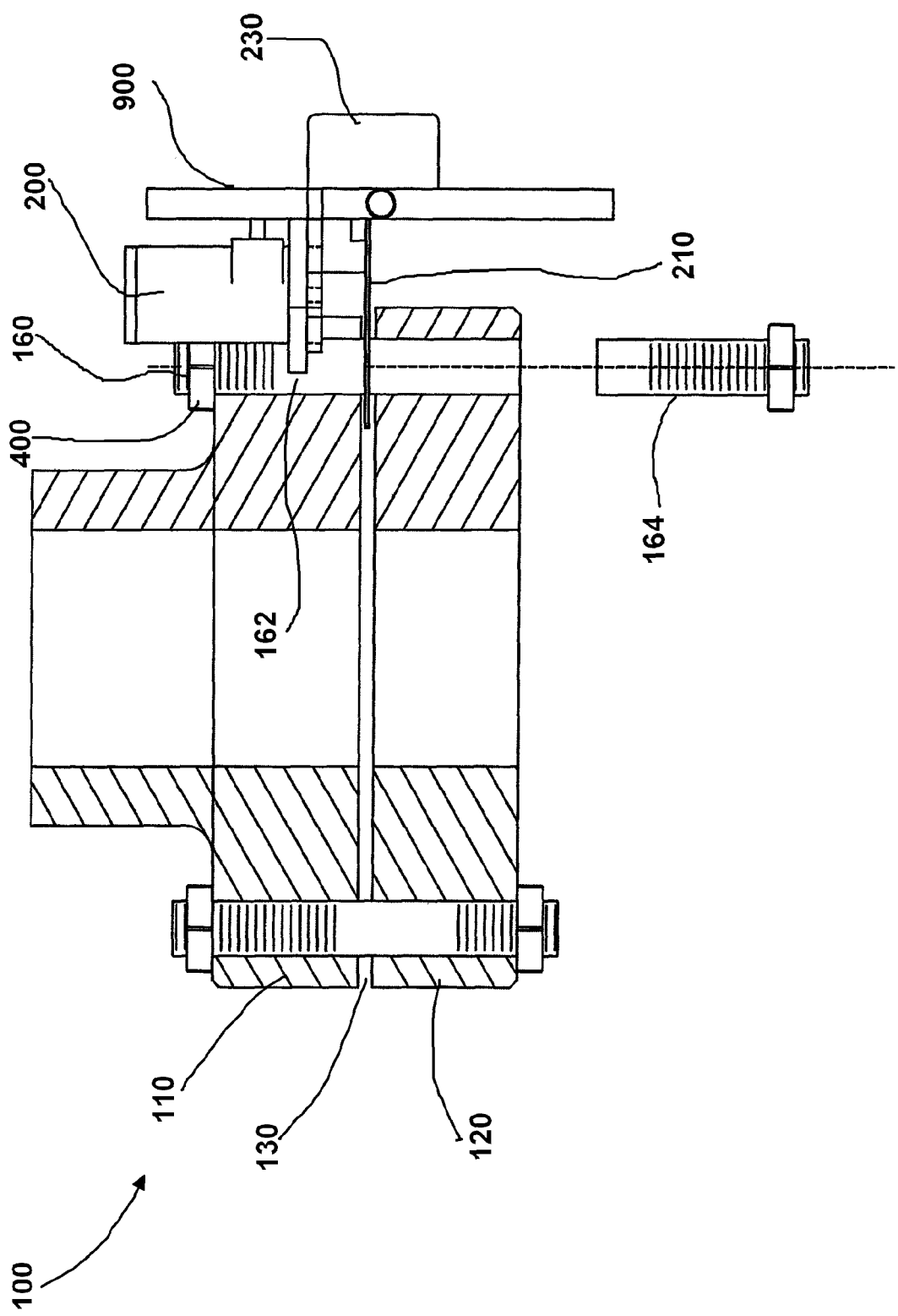
FIG. 4 is a sectional side view of the flange bolt cutter assembly of FIG. 1, after a cut of a bolt has been cut.

FIG. 1 shows one embodiment of flange bolt cutter 10 which can be used to separate flanges in a bolted flange connection 100. FIG. 1 is a top view of one embodiment of the flange bolt cutter assembly 10 attached to a bolt 150 on a flange assembly 100. FIG. 2 is a side view of the flange bolt cutter assembly 10 in position to cut bolt 160 of flange assembly 100. FIG. 3 is a top view of the flange bolt cutter assembly 10, illustrating two different positions of the first arm 800 relative to the flange assembly 100 (schematically indicated by arrows 1310 and 1320). FIG. 4 is a sectional side view of the flange bolt cutter 10 after bolt 160 has been cut with saw 200.

Bolted flange connection 100 can includes upper and lower flanges 110, 120 which are connected through a plurality of flange bolts 140. Between upper 110 and lower 120 flanges can be flange gap 130.

In one embodiment flange bolt cutter 10 includes saw 200 which is vertically and pivotally adjustable relative to mounting assembly 300.

In one embodiment mounting assembly 300 can include mounting bracket 310, first arm 800 which is pivotally connected to mounting assembly, and second arm 900 which is selectively pivotally connected to first arm. In one embodiment saw 200 can be connected to second arm 900.

First arm 800 can include first section 810 (having first and second ends 812,814) and second section 820 (having first and second ends 822,84). First section 810 can be detachably connectable to second section 820 via a clamping member 850 with tightening knob 860. First section 810 can include a threaded area 830 which threadably connects it to vertical adjustment member 600 (allowing vertical adjustability of first arm 800 relative to mounting bracket 310 as schematically indicated by arrows 1280). First section 810 can also include a plurality of stabilizing grooves 816. Second section 820 can include a plurality of stabilizing protrusions 826 which cooperate with the plurality of stabilizing grooves 816. FIGS. 24 and 25 are respectively a top and side views of the first section 810 of first arm 800. FIG. 26 is a side view of the second section 820 of first arm 800. FIG. 27 includes side and top views of the clamping member 850 of the first section 810 of first arm 800.

FIGS. 13, 14, and 15 are respectively is a side, rear, and top views of the second arm 900 of the flange bolt cutter assembly 10. Second arm 900 can have first end 910 and second end 920. At first end 910 can be pivot opening 912 along with a plurality of locking adjustment openings 930 spaced about pivot opening 912. In various embodiments 2, 3, 4, 5, 6, 7, 8, 9, 10, 11, 12, 13, 14, 15, 16, 17, 18, 19, 20, 22, 24, 25, 26, 28, and 30 openings can be provided. In various embodiments these openings 930 can be radially and symmetrically spaced about pivot opening 912. In various embodiments a range between any two of the above referenced number of plurality of openings 930 can be provided.

Although not shown in the drawings in another embodiment a set screw can be used as the quick lock/quick unlock for locking pivot connection between second arm 900 and first arm 800. In this embodiment pivot rod 870 (shown in FIG. 2) can be replaced by a threaded connector and be threaded into pivot opening 818. A frictional lock between threaded pivot rod 870' and second arm 900 is made when pivot rod 870' is pushed against second end 910 of second arm 900. In another embodiment second end 910 can include a plurality of radial teach which can mesh (for pivoting locking between first 800 and second 900 arms) and unmesh (for pivoting unlocking between first 800 and second 900 arms) with a plurality of radial teeth in first arm 800.

Second arm 900 can also have saw mount 950. Second arm 900 can also have handle 980. In one embodiment second arm 900 can have detachable handle extension 980 which extension when attached allows the user to apply increased torque on saw blade 210 when pivoting about the pivot point of first arm 800 (which is vertical adjustment member 600's axis of pivot).

First arm 800 is pivotally connected to base 310 through vertical adjustment member 600, which vertical adjustment member 600 is pivotally connected to base 310. Accordingly, even when first arm 800 is locked with respect to vertical adjustment member 600, first arm 800 will pivot relative to base 310 (and flange assembly 100) because vertical adjustment member 600 itself continues to pivot.

First arm 800 can be pivotally connected to second arm 900. In one embodiment first arm 800 can be selectively pivotally secured to second arm 900 (i.e., in this case a selected angular pivot offset between first 800 and second 900 arms can be selected and these two arms can be pivotally locked at this selected angular offset). Second end 824 can include a pivot rod 870 for second arm 900. Second end 824 can also include a pivot locking member 880 for selectively locking first and second arms 800,900 together as a selected angular offset between first and second arms 800,900. Locking member 880 can be inserted into locking opening 882 and into a selected one of the plurality of pivot locking adjustment openings 930 located in second arm 900.

Upper ring 400 can include first end 410, second end 420, and ring 430. Ring 430 can include opening 440.

Lower ring 500 can include first end 510, second end 520, and ring 530. Ring 530 can include opening 540. Lower ring 500 using a quick lock/quick unlock frictional connector 550.

Saw 200 can include circular saw blade 210, motor 220 which drives saw blade 210. In one embodiment saw 200 can include blade guard 230 which protects the user from the operating saw blade 200 during use. FIGS. 32 and 33 are side and top views of the motor 220 for the saw 200. FIG. 34 is a top view of a saw blade 210. FIGS. 35 and 36 are top and side views of the blade guard 230 for the saw 200. In one embodiment saw blade 210 can include serrated carbide tips, and is sufficiently thin to fit through typical gaps 130 between flanges 110,120 that are bolted together.

Figure 5:
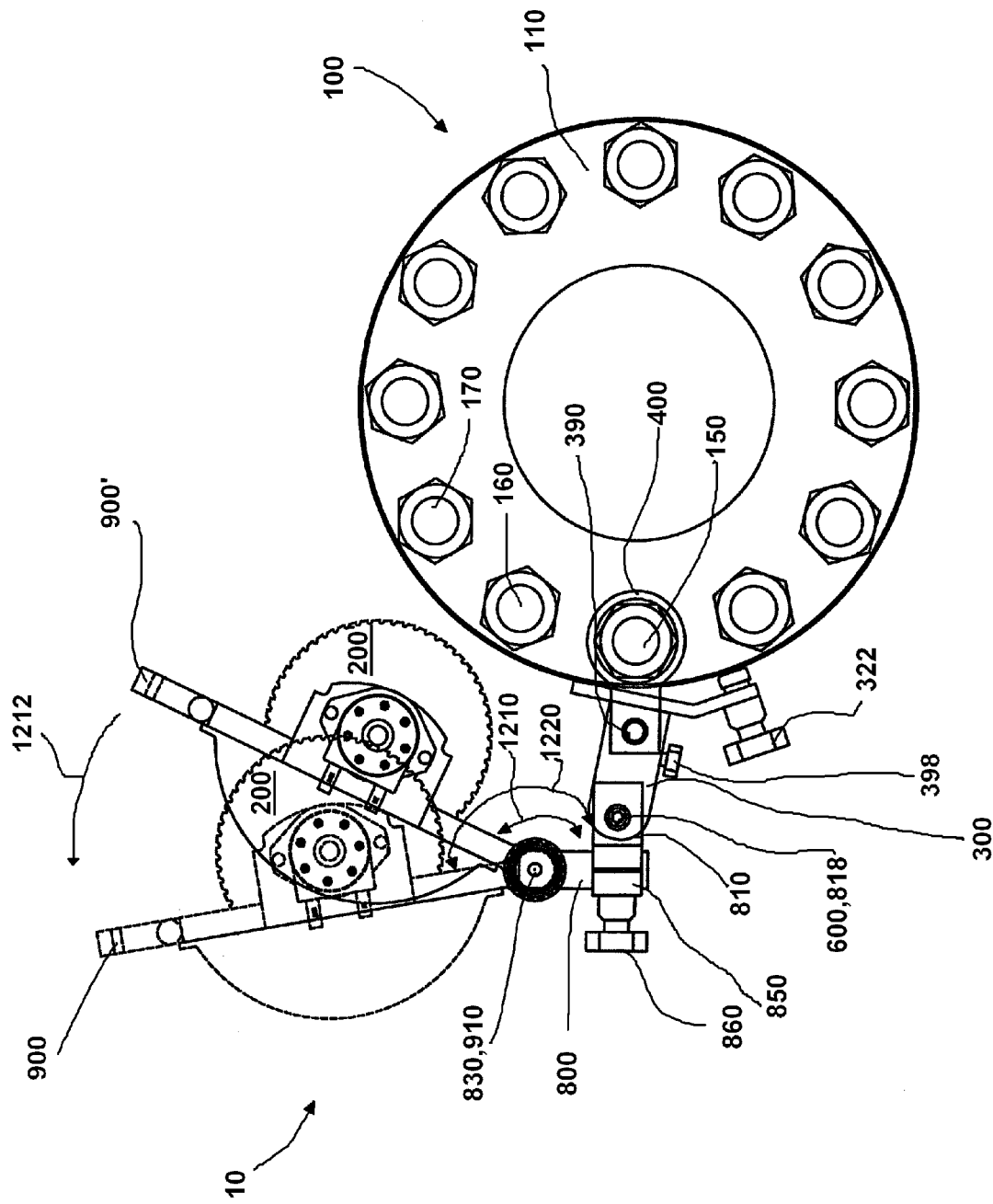
FIG. 5 is a top view of the flange bolt cutter assembly of FIG. 1, illustrating two different relative angular positions of the second arm relative to the first arm.
Figure 6:
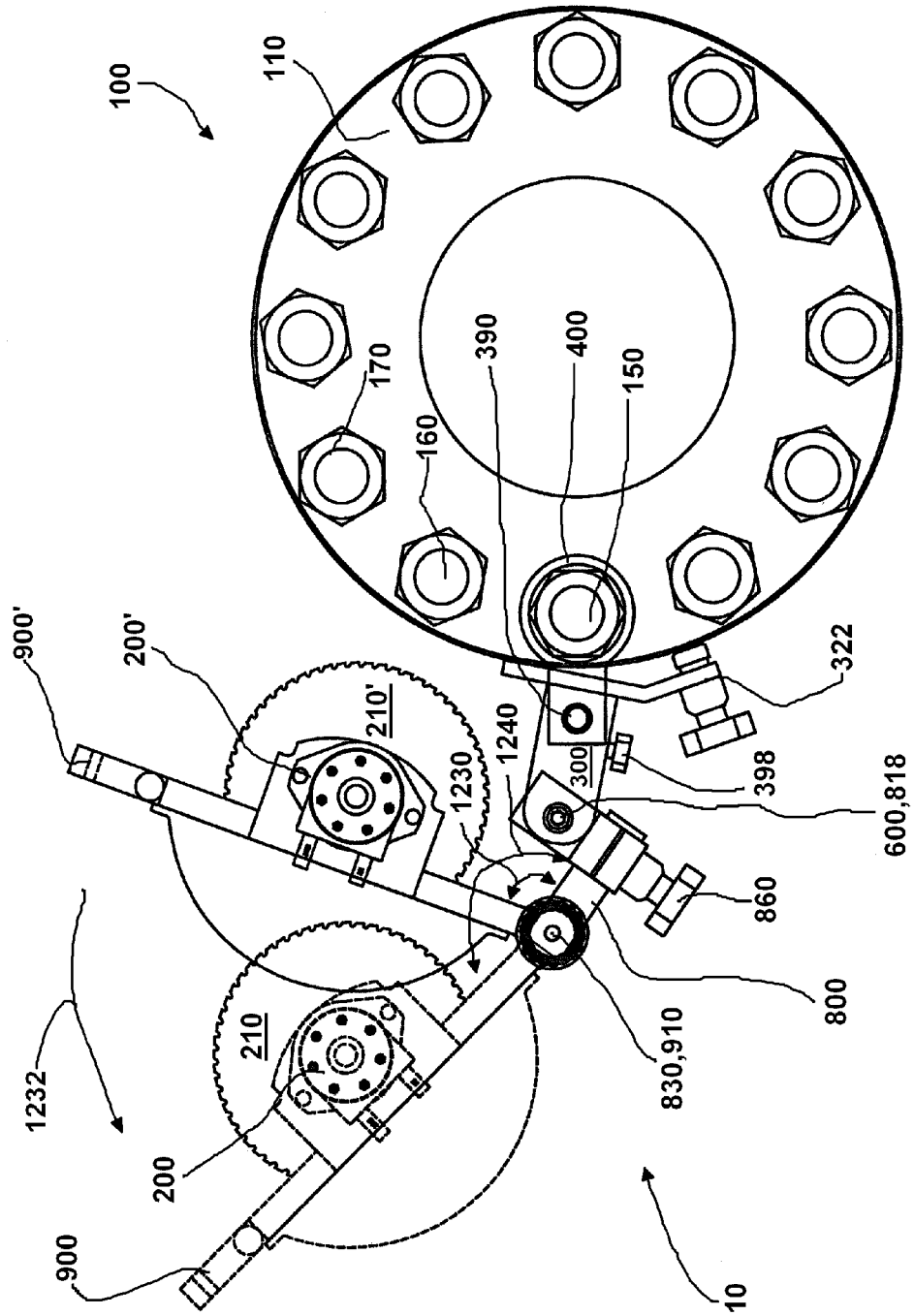
FIG. 6 is a top view of the flange bolt cutter assembly of FIG. 1, illustrating two different relative angular positions of the second arm relative to the first arm.
Figure 7:
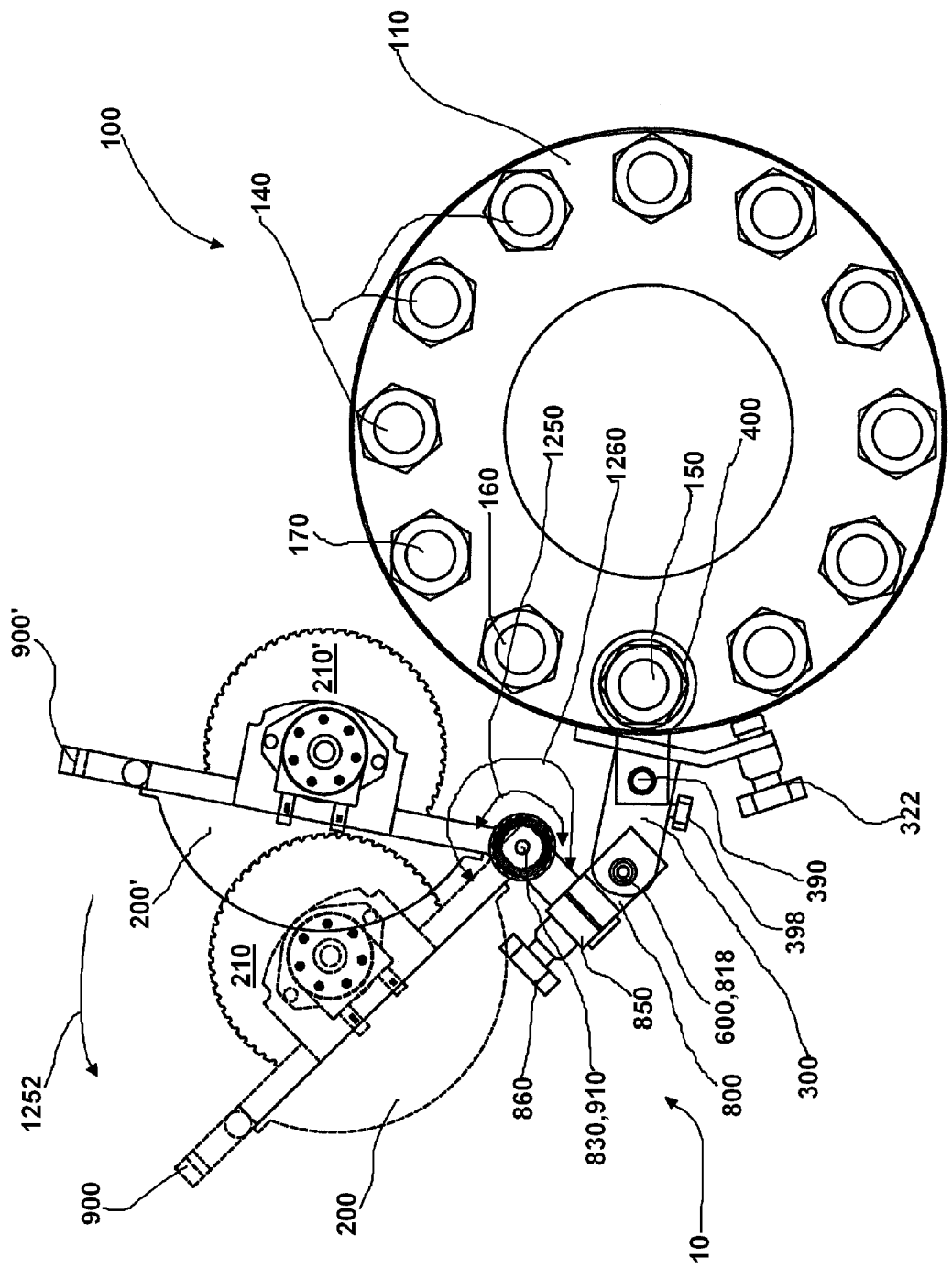
FIG. 7 is a top view of the flange bolt cutter assembly of FIG. 1, illustrating two different relative angular positions of the second arm relative to the first arm.
Figure 8:
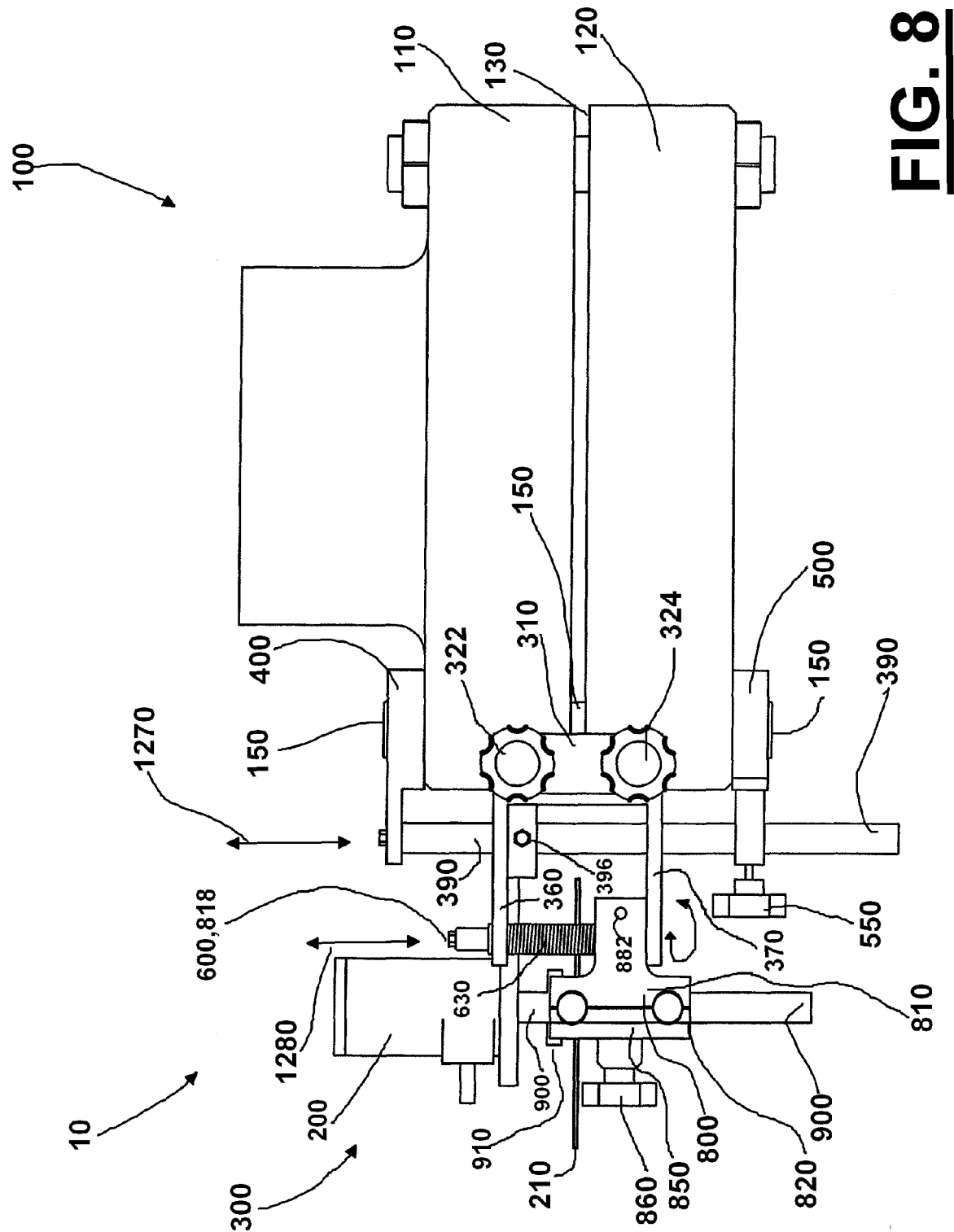
FIG. 8 is a rear view of the flange bolt cutter assembly of FIG. 1, illustrating vertical adjustability with of the saw blade relative to the flange assembly in cutting a bolt using the spacing between the upper and lower flanges.

Saw 10 provides the user the option of selecting different relative angles between first 800 and second 900 arms. FIG. 5 is a top view of the flange bolt cutter assembly 10 illustrating two different relative angular positions of the second arm 900 relative to the first arm 800. FIG. 6 is a top view of the flange bolt cutter assembly 10 illustrating two different relative angular positions of the second arm 900 relative to the first arm 800 (and which relative angular positions are different from those shown in FIG. 5). FIG. 7 is a top view of the flange bolt cutter assembly 10 illustrating two different relative angular positions of the second arm 900 relative to the first arm 800 (and which relative angular positions are different from those shown in FIGS. 5 and 6).

Different sets of locked relative angular positions between first 800 and second 900 arms are schematically indicated by arrows 1210 and 1220 in FIGS. 5, 6, and 7. Adjusting the relative angular position between first 800 and second 900 arms allows the user to adjust the relative position of cutting blade 210 for a bolt to be cut (e.g., bolt 160 or bolt 170). In various embodiments the relative angle between first 800 and second 900 arms can be adjusted in degrees up to 5, 10, 20, 30, 40, 45, 50, 60, 70, 80, 100, 110, 120, 130, 140, 150, 160, 170, 180, 210, 240, 270, 300, and 330. In various embodiments a range between any two of the above referenced degrees can be provided.

Saw 10 also provides the user the option of adjusting the relative height between saw blade 210 and the upper mounting point of mounting assembly 300 (e.g., upper ring 400).

In one embodiment vertical adjustment can be achieved by turning vertical adjustment member 600. In one embodiment first arm 800 can be vertically adjustable relative to mounting assembly 300. In one embodiment mounting assembly 300 can include mounting base 310 which is detachably connectable to flange assembly 100, vertical adjustment threaded member 600 which is threadably connected to mounting base and first arm 800. Vertical adjustment member 600 is threadably connected to first arm 800. Turning vertical adjustment member 600 (relative to first arm 800) in a first direction causes first arm 800 (and saw blade 210) to move upwards in a vertical direction. Turning vertical adjustment member 600 (relative to first arm 800) in a second direction (the opposite direction as the first direction) causes first arm 800 (and saw blade 210) to move downwards in a vertical direction.

Figure 16:
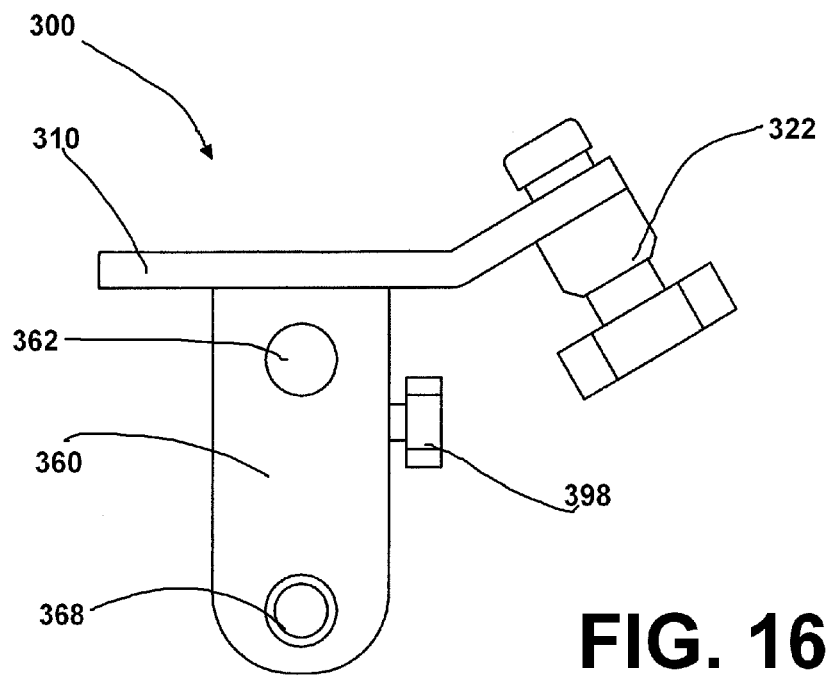
FIG. 16 is a top view of the clamp of the flange bolt cutter assembly of FIG. 1.
Figure 17:
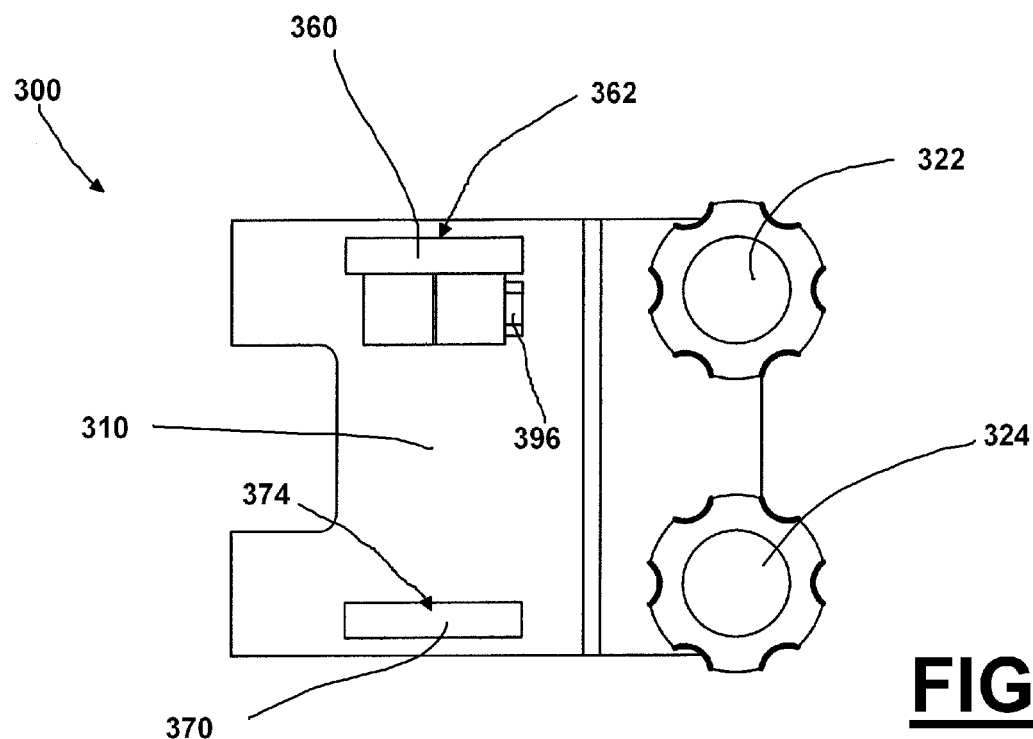
FIG. 17 is a side view of the clamp of the flange bolt cutter assembly of FIG. 1.
Figure 19:
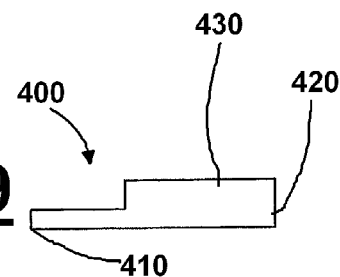
FIG. 19 is a side view of the upper ring.
Figure 18:
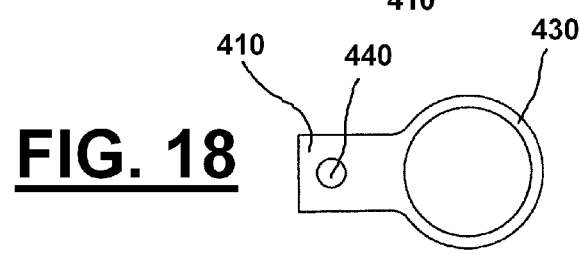
FIG. 18 is a top view of an upper ring from the clamp of the flange bolt cutter assembly of FIG. 1.
Figure 23:
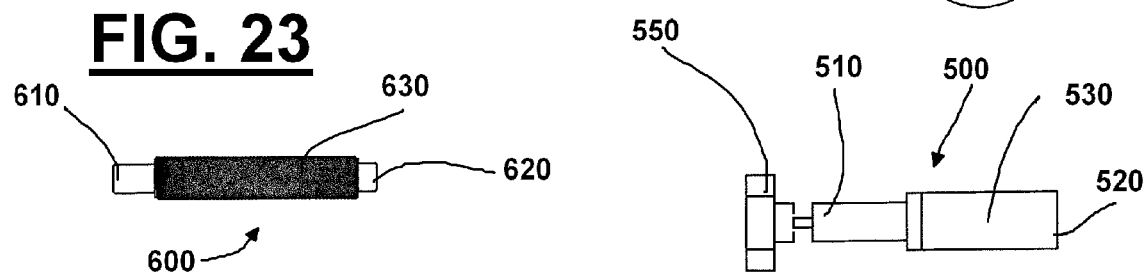
FIG. 23 is a side view of the vertical adjustment threaded member of the clamp assembly.
Figure 21:
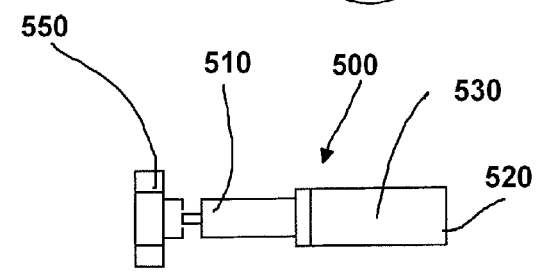
FIG. 21 is a side view of the lower ring.
Figure 22:
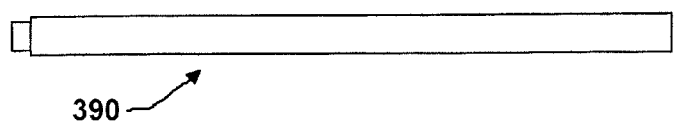
FIG. 22 is a side view of the ring rod of the clamp assembly for the upper and lower rings.
Figure 20:
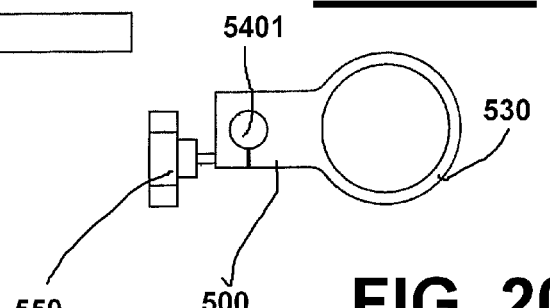
FIG. 20 is a top view of a lower ring from the clamp of the flange bolt cutter assembly of FIG. 1.

FIGS. 16 and 17 are respectively top and side views of the bracket 310 of the flange bolt cutter assembly 10. FIGS. 18 and 19 are respectively top and side views of an upper ring 400. FIGS. 20 and 21 are respectively top and side views of a lower ring 500. FIG. 21 is a side view of the lower ring. FIG. 22 is a side view of the ring rod 390 of the clamp assembly 310 for the upper 400 and lower 500 rings. FIG. 23 is a side view of the vertical adjustment threaded member 600. In one embodiment mounting assembly 300 includes a mounting rod 390 which is slidably connected to base 310. In one embodiment mounting rod 390 includes a frictional sliding lock 396 which can vertically limit the amount of sliding movement between base 310 and mounting rod 390. Mounting rod 390 can be detachably connected to upper ring 400 using a threaded fastener. Mounting rod 390 can be detachably connected to lower ring 500 using a quick lock/quick unlock frictional connector 550. In one embodiment vertical adjustment can be achieved by sliding mounting plate 310 relative to ring rod 390. Mounting plate 310 is slidably connected to ring rod 390 and includes first 396 or second 398 frictional connectors to frictionally lock (and unlock) plate 310 relative to ring rod 390. Tightening first 396 or second 398 frictional connectors causing mounting plate to be vertically frictionally locked relative to ring rod 390. Loosening first 396 or second 398 frictional connectors causes mounting plate to be vertically frictionally unlocked relative to ring rod 390. When unlocked mounting place 310 can move vertically (up or down) to a selected desired position relative to upper ring 400.

Figure 9:
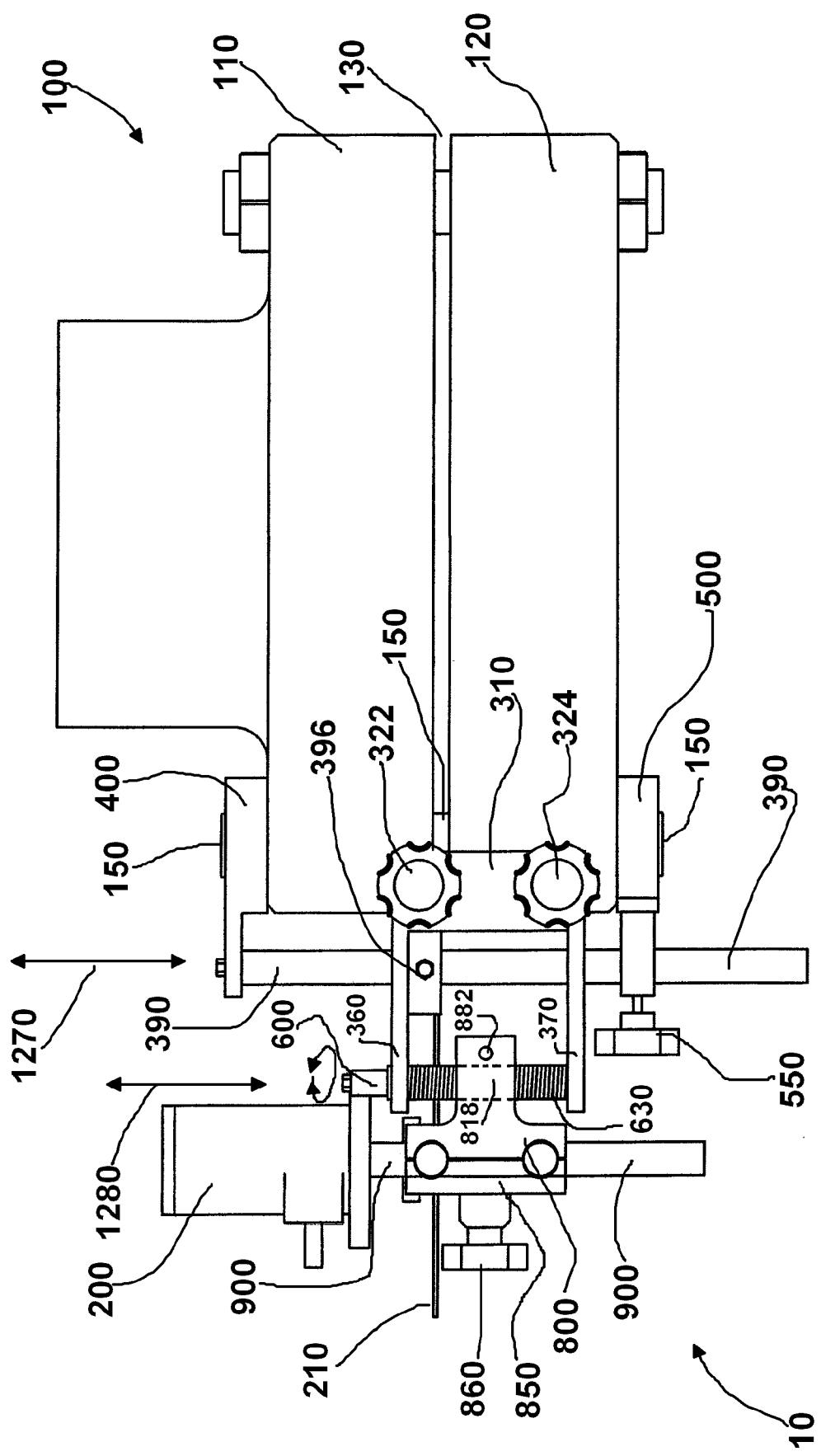
FIG. 9 is a rear view of the flange bolt cutter assembly of FIG. 1, illustrating vertical adjustability with of the saw blade relative to the flange assembly in cutting a bolt using the spacing between the upper and lower flanges.

FIG. 9 is a rear view of the flange bolt cutter assembly 10 illustrating vertical adjustability with of the saw blade 200 relative to flange 110 in cutting a bolt 160 using the spacing 130 between the upper and lower flanges. In FIG. 9 first arm 800 has been placed in its lowermost position on vertical rod 600 of bracket 310, and bracket 310 has been positioned relative to sliding post 390 with both actions intended to position saw blade 210 level with space 130.

Figure 10:
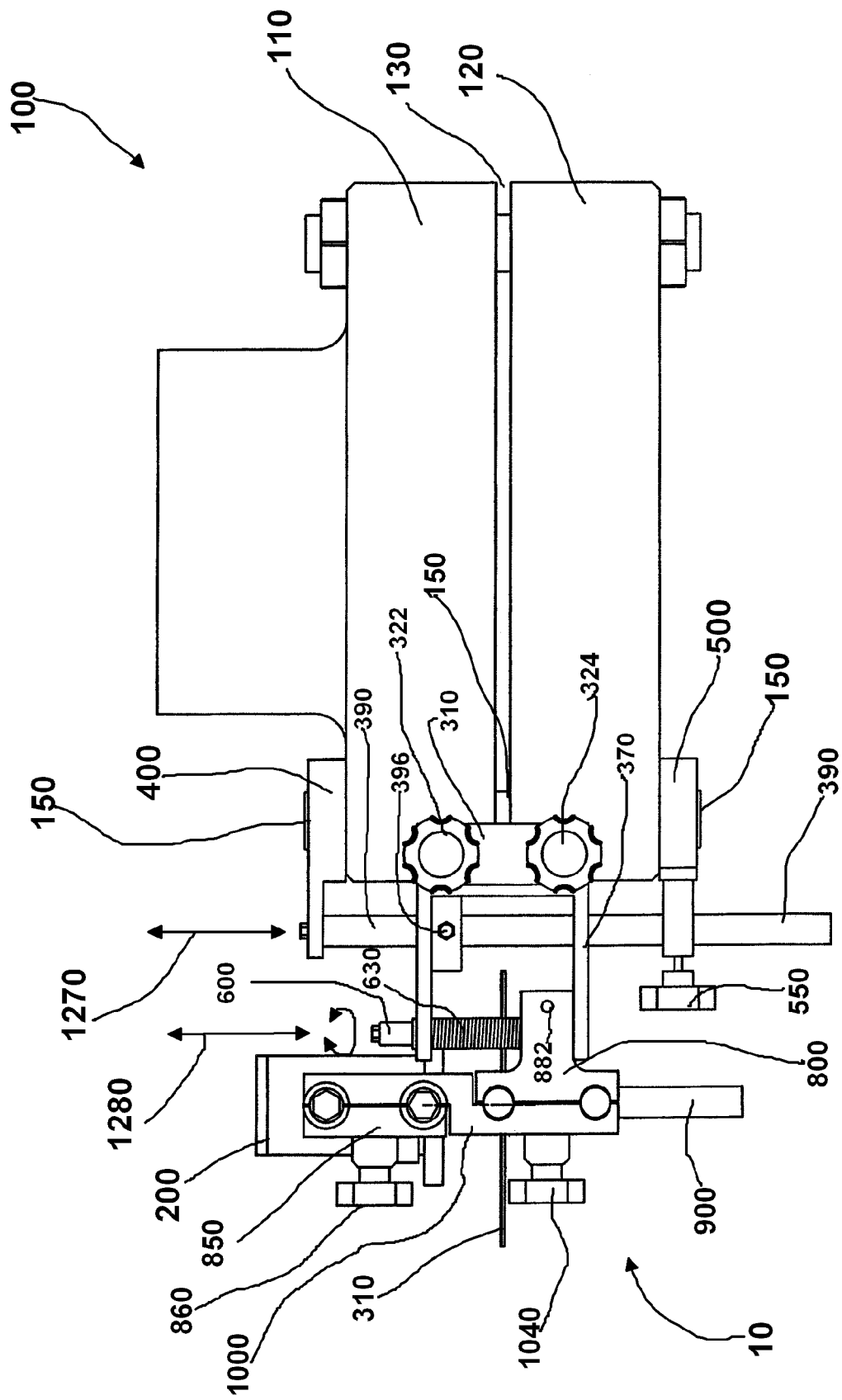
FIG. 10 is a rear view of the flange bolt cutter assembly of FIG. 1, illustrating the use of the vertical spacer assembly along with vertical adjustability with of the saw blade relative to the clamping assembly in cutting the head of a bolt.

FIG. 10 is a rear view of the flange bolt cutter assembly 10 illustrating vertical adjustability with of the saw blade 200 relative to flange 110 in cutting a bolt 160 using the spacing 130 between the upper and lower flanges (which adjustment positions are different from those shown in FIG. 9). In FIG. 10 first arm 800 has been placed in a vertically intermediate position on vertical rod 600 of bracket 310, and bracket 310 has been vertically positioned relative to sliding post 390 with both actions intended to position saw blade 210 level with space 130.

Pivoting flange bolt cutter 10 can be attached to the flanged connection 100 using one of the plurality of bolts 140. For example, first flange bolt 150 can be used to attach cutter 10. Mounting assembly 300 can be attached to flange bolt 150 using upper and lower rings 400, 500. Upper ring 400 can be placed on the head of bolt 150, and lower ring 500 can be placed on the nut of bolt 150. Depending on the vertical spanning distance between the head and nut of bolt 150 the vertical distance between upper 400 and lower 500 rings can be adjusted. This vertical spanning distance is adjusted via lower ring 500 being slid vertically on mounting rod 390 until opening 550 of lower ring 500 goes over the nut of bolt 150. Once this occurs quick lock/quick unlock 550 can be set in a locked position causing mounting base 310 to be held relative to bolt 150 along with upper and lower flanges 110,120.

Because mounting base 310 is slidable relative to mounting rod 390, base 310 can be selectively positioned vertically between upper 400 and lower 500 rings as desired by the user. Once the desired selected vertical positions is obtained, mounting base 310 can be vertically locked relative to mounting rod 390 by using first frictional connector 396 thereby frictionally locking these two components.

At this point mounting base 310 attached to upper 400 and lower 500 rings will be loosely attached to bolt 150. To cause a firm connection one or both of the first 322 and second 324 adjustable connectors can be tightened. First adjustable connector 322 will selectively push against upper flange 110. Second adjustable connector 324 will selectively push against lower flange 120. Because first adjustable connector 322 is separately adjustable relative to second adjustable connector 324 different sized flanges can be accommodated between upper 110 and lower 120 flanges. For example upper flange 110 may be slightly larger than lower flange 110 so that second adjustable connector 324 can accommodate this larger distance from the base 310 and still firmly push against lower flange 120. Because of the separate adjustable connectors 322,324, in most all cases mounting base can have a stable (i.e., at least three point) planer pushing surface between upper 110 and lower 120 flanges to mounting base 310. These three points will be upper connector 322 (pushing against upper flange 110), lower connector 324 (pushing against lower flange 120), and at least one of the gripping surfaces 332 of base 310 (pushing against upper and/or lower flanges 110,120). In this manner base 310 is firmly secured between upper ring 400 (on the head of bolt 150), lower ring 500 (on the nut of bolt 150), mounting rod 390 (attached to base 310) and the surfaces of upper and lower flanges 110, 120.

In attaching mounting assembly 300 to bolt 150, the user roughly adjusts the vertical height of saw blade 210 relative to the gap 130 between upper and lower flanges 110,120. Such rough vertical adjustment can be made by sliding base 310 relative to mounting rod 390 and then fixing the vertical position of base 310 by first frictional connector. However, such rough vertical positioning of saw blade 210 may not exactly position saw blade in the desired vertical position relative to gap 130. In such case the relative vertical height of saw blade 310 can be finely adjusted using vertical adjustment threaded member 600. Because first arm 400 is threadably connected to adjustment member 600 turning of member 600 will cause first arm 400 to move vertically (up or down depending on the direction of rotation of member 600 relative to first arm 400) which movement of first arm 400, causes a coincident movement of second arm 500, and saw blade 210 which is attached to second arm. In this way a fine adjustment of the vertical height of saw blade 210 can be made by the user to made sure that blade 210 can be inserted into the gap 130 to cut a desired bolt from the plurality of bolts 140.

In certain situations, gap 130 between upper and lower flanges 110,120 may not exist, or may not be sufficient to reach a desired bolt from the plurality of bolts 140. In such instances, either the head or the nut of a desired bolt from the plurality of bolts 140 can be cut using the cutting assembly 10. In this instance vertical extension 1000 of first arm 400 may be used to vertically position second arm 500 (and saw blade 210) either substantially above or below first arm 400. Vertical extension 1000 can include first end 1010, second end 1020, and clamping member 1040. Adjacent first end 1010 can be first section 1050 which includes a plurality of stabilizing grooves 1056. Adjacent second end 1020 can be second section 1060 which includes a plurality of stabilizing protrusions 1066.

Figure 11:
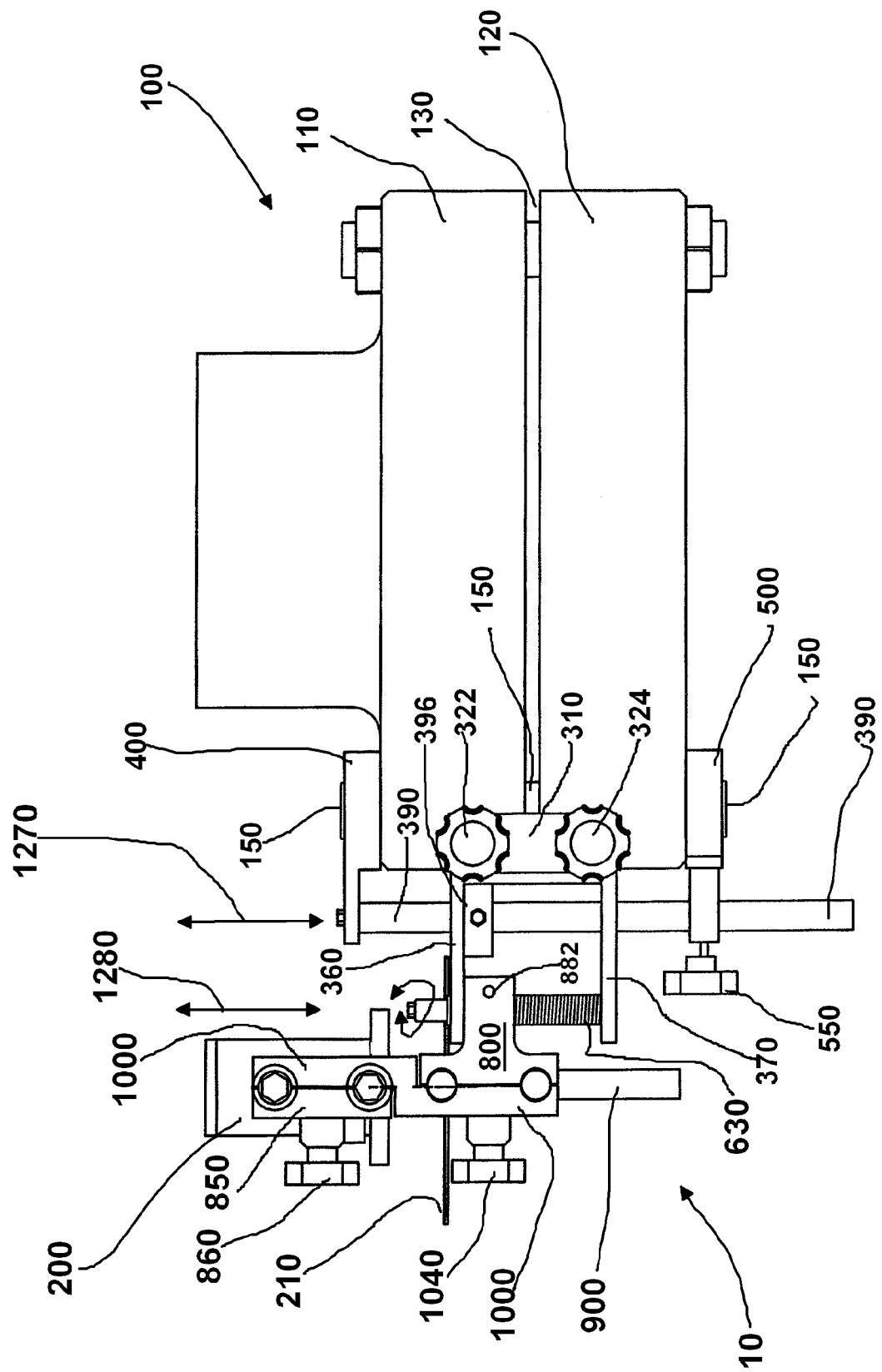
FIG. 11 is a rear view of the flange bolt cutter assembly of FIG. 1, illustrating the use of the vertical spacer assembly along with vertical adjustability with of the saw blade relative to the clamping assembly in cutting the head of a bolt.
Figure 12:
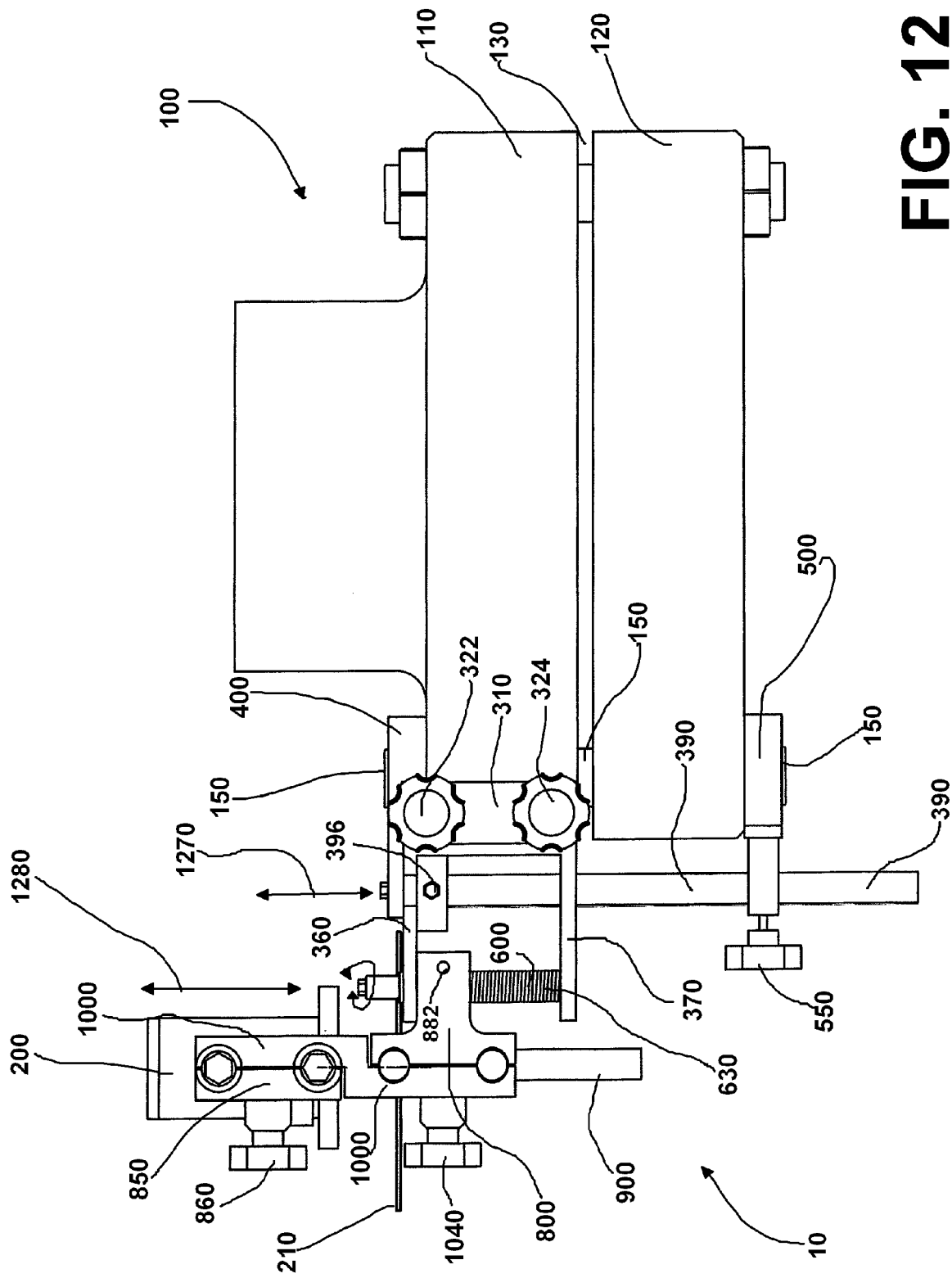
FIG. 12 a rear view of the flange bolt cutter assembly of FIG. 1, illustrating the use of the vertical spacer assembly along with vertical adjustability with of the saw blade relative to the clamping assembly in cutting the head of a bolt.

FIG. 10 is a rear view of the flange bolt cutter assembly 10, illustrating the use of the vertical spacer assembly 1000 along with vertical adjustability with of the saw blade 210 relative to the flange 100 in cutting the head of a bolt 160. FIGS. 28 and 29 are respectively is a side and rear views of the vertical extension member 1000. FIGS. 30 and 31 are respectively a rear and side views of the vertical extension member 1000 vertically extending the second section 820 of the first arm 800 relative to the first section 810. In FIG. 10 first arm 800 (now including vertical spacer 1000) has been placed in its lowermost position on vertical rod 600 of bracket 310, and bracket 310 has been positioned relative to sliding post 390 with both actions intended to position saw blade 210 level with space 130. Of course with vertical spacer 1000 slaw blade 210 can be positioned upwardly to the top of flange 110 to cut the top of bolt 160). In FIG. 11 first arm 800 has been placed in its uppermost position on vertical rod 600 of bracket 310 with saw blade 210 level rising relative to FIG. 10's position but not quite up to the top of flange 110. In FIG. 12 bracket 310 has been positioned upwardly relative to sliding post 390 with first arm 800 has been placed in its uppermost position on vertical rod 600 of bracket 310 causing saw blade 210 to rise level with the top of flange 110. In positioning the vertical position of saw blade 210, relative to flange assembly 100, the user is provided with his choice of options regarding raising first arm 800 using vertical positioning rod 600 and/or sliding bracket 310 relative to ring rod 390.

The following is a list of reference numerals:

LIST FOR REFERENCE NUMERALS

| (Reference No.) | (Description) |
| --- | --- |
| 10 | pivoting flange bolt cutter |
| 100 | flanges |
| 110 | upper flange |
| 120 | lower flange |
| 130 | open area between upper and lower flanges |
| 140 | plurality of flange bolts |
| 150 | first flange bolt |
| 152 | upper half |
| 154 | lower half |
| 160 | second flange bolt |
| 170 | third flange bolt |
| 200 | saw |
| 210 | circular saw blade |
| 220 | motor |
| 222 | hydraulic power lines for motor |
| 230 | saw blade guard |
| 300 | mounting assembly |
| 310 | mounting bracket |
| 320 | first end |
| 322 | first adjustable stopper |
| 324 | second adjustable stopper |
| 330 | second end |
| 332 | gripping surfaces |
| 340 | upper end |
| 350 | lower end |
| 360 | upper plate |
| 362 | opening |
| 364 | washer |
| 368 | opening |
| 370 | lower plate |
| 374 | opening |
| 384 | threaded connector |
| 390 | ring rod |
| 392 | first end |
| 394 | second end |
| 396 | first frictional connector |
| 398 | second frictional connector |
| 400 | upper ring |
| 410 | first end |
| 420 | second end |
| 430 | ring |
| 440 | opening |
| 500 | lower ring |
| 510 | first end |
| 520 | second end |
| 530 | ring |
| 540 | opening |
| 550 | adjustment handle |
| 600 | vertical adjustment threaded member for first arm |
| 610 | first end |
| 612 | bearing |
| 620 | second end |
| 622 | bearing |
| 630 | threaded area |
| 640 | connector |
| 800 | first arm |
| 810 | first section |
| 812 | first end of first section |
| 814 | second end of first section |
| 816 | plurality of stabilizing grooves |
| 818 | pivot opening |
| 820 | second section |
| 822 | first end of second section |
| 824 | second end of second section |
| 826 | plurality of stabilizing protrusions |
| 830 | pivot opening |
| 834 | pivot lock oping |
| 840 | clamping opening |
| 844 | clamping member |
| 850 | attachment member |
| 852 | first recessed area |
| 854 | opening |
| 860 | tightening knob |
| 870 | pivot rod for second arm |

-continued

LIST FOR REFERENCE NUMERALS

| (Reference No.) | (Description) |
|---|---|
| 880 | pivot locking member for second arm |
| 882 | locking opening |
| 900 | second arm |
| 910 | first end |
| 912 | pivot point |
| 920 | second end |
| 930 | plurality of pivot locking adjustment openings |
| 931 | first pivot locking adjustment opening |
| 932 | first pivot locking adjustment opening |
| 933 | first pivot locking adjustment opening |
| 934 | first pivot locking adjustment opening |
| 950 | saw mount |
| 970 | handle |
| 980 | handle extension mount |
| 1000 | vertical extension for first arm |
| 1010 | first end |
| 1020 | second end |
| 1040 | clamping member |
| 1050 | first section |
| 1052 | opening |
| 1056 | plurality of stabilizing grooves |
| 1060 | second section |
| 1062 | opening |
| 1066 | plurality of stabilizing protrusions |
| 1200 | arrow |
| 1210 | arrow |
| 1212 | arrow |
| 1220 | arrow |
| 1230 | arrow |
| 1232 | arrow |
| 1240 | arrow |
| 1250 | arrow |
| 1252 | arrow |
| 1260 | arrow |
| 1270 | arrow |
| 1280 | arrow |
| 1300 | arrow |
| 1310 | arrow |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A flange bolt cutter comprising for cutting a plurality of bolts on a flange connection having upper and lower flange members, comprising:
   (a) a saw assembly;
   (b) an assembly mount detachably connected to the plurality of bolts,
   (c) the mount assembly including first and second arms, the first arm being pivotally mounted on the mount, and the second arm being pivotally connected to the first arm, the saw being attached to the second arm,
   (d) the pivot connection between the first and second arms including a quick lock/quick unlock which in the locked state rotationally locks the first and second arms, and in the unlocked state the first and second arms can rotate related to each other.

2. The flange bolt cutter of claim 1, wherein the saw assembly is vertically adjustable relative to the mount assembly.

3. The flange bolt cutter of claim 2, wherein the assembly mount includes upper and lower rings which attach to the upper and lower portions of a bolt from the plurality of bolts in the flange connection.

4. The flange bolt cutter of claim 3, wherein the assembly mount includes a mounting bracket and mounting rod, wherein the mounting bracket is slidably connected to the mounting rod, and the mounting rod is connected to the upper and lower rings, and wherein the mounting bracket includes a quick lock/quick unlock member for vertically locking the mounting bracket relative to the mounting rod.

5. The flange bolt cutter of claim 4, wherein the lower ring is slidably connected to the mounting rod, and wherein the lower ring includes a quick lock/quick unlock member for vertically locking the lower ring relative to the mounting rod.

6. The flange bolt cutter of claim 3, wherein the assembly mount includes a threaded vertical fine adjustment for the first arm and the threaded vertical adjustment is pivotally mounted to the assembly mount.

7. The flange bolt cutter of claim 6, wherein the locking positions span at least 270 degrees of selectable angular locking positions between the first and second arms.

8. The flange bolt cutter of claim 6, wherein the angular locking positions are located on a circle.

9. The flange bolt cutter of claim 6, wherein the angular locking positions are located on a circle and span a preselected angular spanning amount of the circle, and are symmetrically spaced about the preselected angular spanning amount.

10. The flange bolt cutter of claim 9, wherein the angular locking positions are symmetrically spaced in five degree increments.

11. The flange bolt cutter of claim 3, wherein the assembly mount includes a mounting bracket and mounting rod, wherein the mounting bracket is pivotally connected to the mounting rod, and the mounting rod is connected to the upper and lower rings, and wherein the mounting bracket includes at least one wedging member which adjustably wedges against the flange connection tending to cause the mounting bracket to pivot about the mounting rod.

12. The flange bolt cutter of claim 11, wherein the mounting bracket includes upper and lower wedging members which separately and respectively adjustably wedge against the upper and lower flanges of the flange connection each of the upper and lower wedging members tending to cause the mounting bracket to pivot about the mounting rod.

13. The flange bolt cutter of claim 1, wherein the quick lock/quick unlock connection between the first and second arms includes a plurality of angular locking positions which allow the first and second arms to be locked in on of the plurality of angular locking positions.

14. The flange bolt cutter of claim 1, wherein the first arm includes a vertical adapter which increases the vertical distance between the first and second arms.

15. The flange bolt cutter of claim 1, wherein the saw is powered by a hydraulic motor.

16. The flange bolt cutter of claim 1, wherein the saw includes a blade cover.

17. The flange bolt cutter of claim 1, wherein the second arm includes a handle for pivoting the saw between cutting and non-cutting positions.

18. The flange bolt cutter of claim 1, wherein the second arm includes a detachably mountable handle extension which, when attached to the second arm, increases a torque arm length about the pivot point between the first arm and the mounting assembly.

19. A flange bolt cutter comprising for cutting a plurality of bolts on a flange connection having upper and lower flange members, comprising:
   (a) a saw assembly;
   (b) an assembly mount detachably connected to the plurality of bolts,
   (c) the mount assembly including first and second arms, the first arm being pivotally mounted on the mount, and the second arm being pivotally connected to the first arm, the saw being attached to the second arm,
   (d) the first arm including a quick lock/quick unlock which in the locked state vertically locks the first arm relative to the mount assembly while allowing rotational movement of the first arm relative to the mount assembly.

20. The flange bolt cutter of claim 19, wherein the assembly mount includes upper and lower rings which attach to the upper and lower portions of a bolt from the plurality of bolts in the flange connection.

\* \* \* \* \*